United States Patent
Jung

(10) Patent No.: US 7,821,566 B2
(45) Date of Patent: Oct. 26, 2010

(54) IMAGE SENSOR AND CAMERA SYSTEM HAVING THE SAME

(76) Inventor: Byung-Geun Jung, 1 Hyangjeong-dong, Heungduk-gu, Cheongju-si, Chungcheongbuk-do, 361-725 (KR)

(*) Notice: Subject to any disclaimer, the term of this patent is extended or adjusted under 35 U.S.C. 154(b) by 763 days.

(21) Appl. No.: 11/319,745

(22) Filed: Dec. 29, 2005

(65) Prior Publication Data
US 2006/0188243 A1    Aug. 24, 2006

(30) Foreign Application Priority Data
Feb. 24, 2005   (KR)   .............. 10-2005-0015496

(51) Int. Cl.
*H04N 5/232*   (2006.01)
(52) U.S. Cl. .................... 348/345; 348/294
(58) Field of Classification Search .......... 348/294, 348/345, 347, 349; 250/E27.162, 208.1
See application file for complete search history.

(56) References Cited

U.S. PATENT DOCUMENTS

| | | | |
|---|---|---|---|
| 6,271,883 B1* | 8/2001 | Iijima et al. | 348/345 |
| 7,251,386 B1* | 7/2007 | Dickinson et al. | 385/14 |
| 2004/0165879 A1* | 8/2004 | Sasaki et al. | 396/137 |
| 2004/0169734 A1* | 9/2004 | Umeyama | 348/218.1 |

FOREIGN PATENT DOCUMENTS

KR   10-2004-0075054   8/2004

OTHER PUBLICATIONS

However Ackland, Brian & Alex Dickinson Camera on a chip Ackland, B.; Dickinson, A.; Solid-State Circuits Conference, 1996. Digest of Technical Papers. 43rd ISSCC., 1996 IEEE International Feb. 8-10, 1996 pp. 22-25, 412.*
Ackland, Brian & Alex Dickinson Camera on a chip Ackland, B.; Dickinson, A.; Solid-State Circuits Conference, 1996. Digest of Technical Papers. 43rd ISSCC., 1996 IEEE International Feb. 8-10, 1996 pp. 22-25, 412.*
Ackland, Brian & Alex Dickinson Camera on a chip Ackland, B.; Dickinson, A.; Solid-State Circuits Conference, 1996. Digest of Technical Papers. 43rd ISSCC., 1996 IEEE International Feb. 8-10, 1996 pp. 22-25,412.*

* cited by examiner

*Primary Examiner*—Tuan Ho
(74) *Attorney, Agent, or Firm*—McAndrews, Held & Malloy, Ltd.

(57) ABSTRACT

An image sensor includes a pixel array having a plurality of unit pixels with high light sensitivity, for sensing information about image received from an exterior; a control and interface unit for controlling an overall operation of an image sensor chip and acting as an interface with an external system; an analog signal processing unit for processing an analog signal from the pixel array after being controlled by the control and the interface unit; an A/D converter for converting the analog signal into a digital signal; a picture signal processing unit for performing a plurality of image processes in order to enhance image of the digital signal, wherein the picture signal processing unit includes a focus value calculator for calculating a focus value from the digital signal; and an interface unit for providing an exterior with the focus value calculated through the focus value calculator.

22 Claims, 2 Drawing Sheets

IMAGE SENSOR AND CAMERA SYSTEM HAVING THE SAME

FIELD OF INVENTION

The present invention relates to a camera system having an image sensor; and, more particularly, to a camera system where an image sensor chip and a driving chip are integrated as a system on chip (SOC) type that an image focus value is supplied from the image sensor chip to the driving chip through a 2-wire serial interface.

DESCRIPTION OF PRIOR ART

As is well known, an image sensor is a device that captures images using light sensitivity of a semiconductor material. Pixels sense brightness and wavelength of the light reflected from a subject and read its image data as an electric value. That is, the image sensor converts the electric value into a predetermined level that can be signal-processed.

Among various image sensors, a complementary metal oxide semiconductor (CMOS) image sensor is widely used for a modern mobile phone because it is possible to implement a highly integrated circuit in the device and reduce power consumption in comparison with the other image sensors such as a charge coupled device (CCD).

Meanwhile, an auto focus control function is essentially required in a camera system incorporating a modern image sensor. Therefore, how accurate the focus value is in spite of various environments becomes a criterion to determine a function of the image sensor.

The auto focus control technique is to analyze characteristic of the image obtained from the pixel and adjust a lens to a position having the highest focus value by using edge information of a high frequency component.

FIG. 1 is a block diagram setting forth a conventional image sensor.

Referring to FIG. 1, the conventional image sensor includes a pixel array 10, a control and interface unit 11, an analog signal processing unit 12, an analog to digital converter (ADC) 13 and a picture signal processing unit 14. Herein, the pixel array 10 is provided with N×M number of unit pixels.

The control and interface unit 11 controls an overall operations of an image sensor chip by using a finite state machine (FSM) and act as an interface with an external system. In addition, the control and interface unit 11 has a batch register so that it is possible to program items regarding various internal operations and further, to control operations of the whole chip according to this program.

The pixel array 10 provided with the M×N number of unit pixels having excellent light sensitivity senses information about an image received from an exterior, which is an essential element of the image sensor chip.

The analog signal processing unit 12 is provided with a correlated double sampling (CDS) unit and an analog amplifier. Herein, the CDS unit is used for removing fixed pattern noise (FPN) of the pixel in virtue of a CDS technique. The analog amplifier converts a picture signal into a predetermined electric signal.

The A/D converter 13 converts an analog signal into a digital signal.

Though it is not shown in the drawings, the image sensor may further include a pixel line memory unit for storing digital voltage of the pixel that is converted at the A/D converter 13, wherein the pixel line memory unit may have a plurality of lines in order to perform various functions of the picture signal processing unit 14.

Meanwhile, according to the function of the image sensor, the picture signal processing unit 14 performs various functions for enhancing performance of the image sensor on the basis of the output value of the pixel stored at the pixel line memory unit such as color interpolation, color correction, gamma correction, auto white balance, auto exposure and so forth.

In general, a camera system using the image sensor includes the image sensor chip and the driving chip, i.e., a back-end chip, wherein two chips are integrated as a system on chop (SOC) type.

The image sensor chip receives light and converts it into a predetermined electric signal. The driving chip receives picture information transferred from the image sensor and plays roles in raising picture quality, compressing information and adjusting image size.

In the conventional image sensor as shown in FIG. 1, when a digital image outputted from the image signal-processing unit 14 is delivered to the driving chip though the control and the interface unit 11, the driving chip begins to be operated as aforementioned.

However, the conventional camera system should use an additional circuit in the driving chip for controlling an auto focus. Furthermore, the focus value is calculated from the digital image output at the additional circuit.

In this case, it is required for implementing the additional circuit in the driving chip for analyzing lots of real-time digital image data and calculating the focus data from the data. Moreover, since the digital image output is outputted as various formats according to users, the accuracy of the focus value becomes degraded in case of calculating the focus value using these various outputted signals.

SUMMARY OF INVENTION

It is, therefore, an object of the present invention to provide an image sensor and a camera system having the same capable of calculating an accurate focus value and improving an integration degree thereof for an auto focus control.

In accordance with an aspect of the present invention, there is provided an image sensor including: a pixel array having a plurality of unit pixels with high light sensitivity, for sensing information about image received from an exterior; a control and interface unit for controlling an overall operation of an image sensor chip and acting as an interface with an external system; an analog signal processing unit for processing an analog signal from the pixel array after being controlled by the control and the interface unit; an analog to digital (A/D) converter for converting the analog signal into a digital signal; a picture signal processing unit for performing a plurality of image processes in order to enhance image of the digital signal, wherein the picture signal processing unit includes a focus value calculator for calculating a focus value from the digital signal; and an interface unit for providing an exterior with the focus value calculated through the focus value calculator.

In accordance with another aspect of the present invention, there is provided a camera system where an image sensor chip and a driving chip are integrated as an SOC, the image sensor chip including: a pixel array having a plurality of unit pixels with high light sensitivity, for sensing information about image received from an exterior; a control and interface unit for controlling an overall operation of an image sensor chip and acting as an interface with an external system; an analog signal processing unit for processing an analog signal from the pixel array after being controlled by the control and the interface unit; an A/D converter for converting the analog signal into a digital signal; a picture signal processing unit for performing a plurality of image processes in order to enhance image of the digital signal, wherein the picture signal processing unit includes a focus value calculator for calculating a focus value from the digital signal; and an interface unit for providing an exterior with the focus value calculated through the focus value calculator.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF INVENTION

The present invention will now be described more fully with reference to the accompanying drawings, in which exemplary embodiments of the invention are shown.

Figure 2:
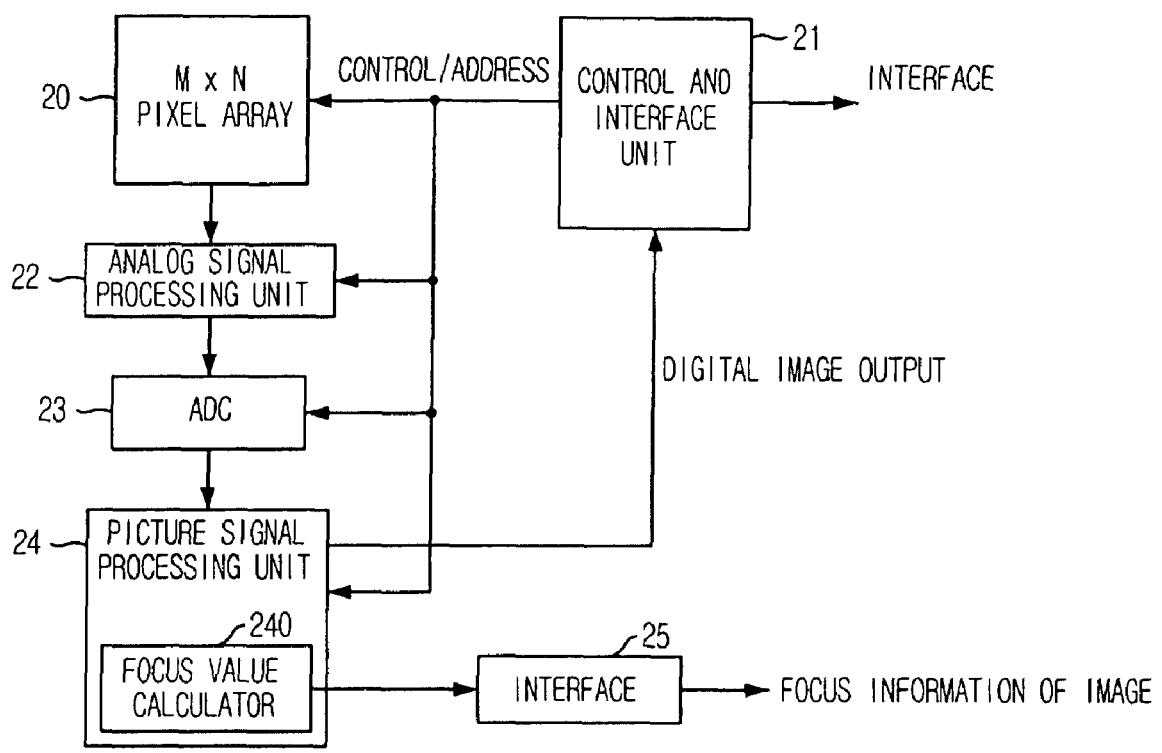
FIG. 2 is a block diagram setting forth an image sensor in accordance with a preferred embodiment of the present invention.

FIG. 2 is a block diagram setting forth an image sensor in accordance with a preferred embodiment of the present invention.

Referring to FIG. 2, the image sensor of the present invention includes a pixel array 20, a control and interface unit 21, an analog signal processing unit 22, an analog to digital converter (ADC) 23, a picture signal processing unit 24 and an interface unit 25. Herein, the pixel array 20 is provided with N×M number of unit pixels.

The control and interface unit 21 controls an overall operations of an image sensor chip by using a finite state machine (FSM) and act as an interface with an external system. In addition, the control and interface unit 21 has a batch register so that it is possible to program items regarding various internal operations and further, to control operations of the whole chip according to this program.

The pixel array 20 provided with the M×N number of unit pixels having excellent light sensitivity senses information about an image received from an exterior, which is an essential element of the image sensor chip.

The analog signal processing unit 22 is provided with a correlated double sampling (CDS) unit and an analog amplifier. Herein, the CDS unit is used for removing fixed pattern noise (FPN) of the pixel in virtue of a CDS technique. The analog amplifier converts a picture signal into a predetermined electric signal.

The A/D converter 13 converts an analog signal into a digital signal.

Though it is not shown in the drawings, the image sensor may further include a pixel line memory unit for storing digital voltage of the pixel that is converted at the A/D converter 23, wherein the pixel line memory unit may have a plurality of lines in order to perform various functions of the picture signal processing unit 24.

Meanwhile, according to the function of the image sensor, the picture signal processing unit 24 performs various functions for enhancing performance of the image sensor on the basis of the output value of the pixel stored at the pixel line memory unit such as color interpolation, color correction, gamma correction, auto white balance, auto exposure and so forth.

While the focus value is calculated by using a digital image output at a driving chip integrated with the image sensor chip in the conventional image sensor, the inventive image sensor include the picture signal processing unit 24 incorporating a focus value calculator 240.

Therefore, the focus value calculator 240 calculates the focus value according to a real-time variant image by using a red, green and blue (RGB) digital image data that an interpolation has been completed and then, accumulates the calculated focus value corresponding to every pixel till one image frame is completed.

The focus value calculator 240 outputs focus information of accumulated images after one image frame passes. Afterwards, the focus information of the image is supplied to the driving chip through the interface 25 embodied in the image sensor. Herein, the interface 25 may include a 2-wire serial interface.

Figure 1:
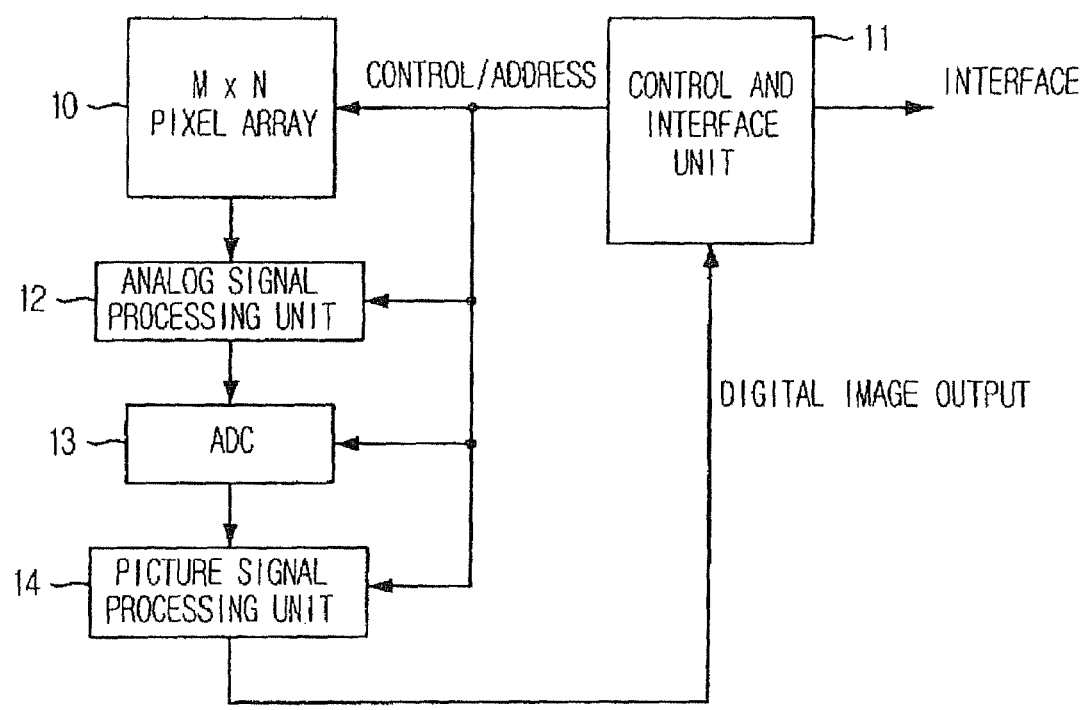
FIG. 1 is a block diagram setting forth a conventional image sensor.

In the conventional image sensor as depicted in FIG. 1, an additional circuit should be required for the auto focus control, which is an obstacle to a highly integrated device. That is, the focus value can be calculated from the digital image output by using the additional circuit. As a result, in case of various typed output signal, the conventional image sensor shows a drawback that calculation accuracy is inevitably degraded. Moreover, the additional circuit for the auto focus control makes it difficult to implement a highly integrated device in the long run.

On the contrary, in accordance with the present invention, i.e., the inventive camera system where the image sensor and the driving chip are integrated as an SOC type, the picture signal processing unit disposed in the image sensor chip calculates the real-time variant focus value and then, is supplied to the driving chip through the supplementary interface. Therefore, the output of the processed image has data range of 8 bit, whereas the internal picture signal processing unit can calculate the focus value of 10 bit, 11 bit or more according to bit range of the A/D converter.

As described above, the present invention provides advantageous merits that it is possible to raise an integration degree of the SOC typed camera system to thereby enhance productivity. In addition, since the auto focus is accurately controlled in accordance with the present invention, the performance of the camera system having the image sensor can be remarkably improved.

Meanwhile, though the aforementioned embodiment of the present invention is mainly focused on the CMOS image sensor, it is obvious that the present invention may be applied to the other various typed image sensors.

The present application contains subject matter related to Korean patent application No. 2005-0015496, filed in the Korean Patent Office on Feb. 4, 2005, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A camera system in which an image sensor chip and a driving chip are integrated as a system on chip (SOC), the image sensor chip comprising:
    a pixel array having a plurality of unit pixels with high light sensitivity, wherein the pixel array is configured to sense image information received from an exterior;

a control and interface unit configured to control an overall operation of the image sensor chip and act as an interface with an external system;
an analog signal processing unit configured to process an analog signal from the pixel array;
an analog-to-digital (A/D) converter configured to convert the analog image signal into a digital image signal;
a picture signal processing unit configured to perform a plurality of image processes including color adjustment in order to enhance the digital image signal, wherein the picture signal processing unit includes a focus value calculator configured to calculate a focus value from the digital image signal and output the focus value; and
an interface configured to transfer the focus value to the driving chip.

2. The camera system of claim 1, wherein the focus value calculator is further configured to calculate the focus value for each pixel in real time, accumulate the calculated focus value until one frame is completed, and output the resulting value in a frame unit.

3. The camera system of claim 1, wherein the driving chip is configured to receive picture information transferred from the image sensor chip and play roles in raising picture quality, compressing information, and adjusting image size.

4. The camera system of claim 1, wherein the control and interface unit comprises a finite state machine (FSM).

5. A camera system in which an image sensor chip and a driving chip are integrated as a system on chip (SOC), the image sensor chip comprising:
a pixel array;
a control and interface unit;
an analog signal processing unit;
an analog-to-digital (AID) converter; and
a picture signal processing unit configured to perform a plurality of image processes including color adjustment in order to enhance the digital image signal, wherein the picture signal processing unit includes a focus value calculator configured to calculate a focus value from the digital image signal and output the focus value.

6. The camera system of claim 5, wherein the pixel array comprises a plurality of unit pixels with high light sensitivity, and wherein the pixel array is configured to sense image information received from an exterior.

7. The camera system of claim 5, wherein the control and interface unit is configured to control an overall operation of the image sensor chip and act as an interface with an external system.

8. The camera system of claim 5, wherein the analog signal processing unit is configured to process an analog signal from the pixel array.

9. The camera system of claim 5, wherein the A/D converter is configured to convert an analog image signal into a digital image signal.

10. The camera system of claim 5, further comprising an interface configured to transfer the focus value to the driving chip.

11. The camera system of claim 5, wherein the focus value calculator is further configured to calculate the focus value for pixels in real time, accumulate the calculated focus value until one frame is completed, and output the resulting value in a frame unit.

12. The camera system of claim 5, wherein the driving chip is configured to receive picture information transferred from the image sensor chip and play roles in raising picture quality, compressing information and adjusting image size.

13. The camera system of claim 5, wherein the control and interface unit comprises a finite state machine (FSM).

14. A camera system in which an image sensor chip and a driving chip are integrated as a system on chip (SOC), the image sensor chip comprising:
a picture signal processing unit configured to perform a plurality of image processes including color adjustment in order to enhance a digital image signal, wherein the picture signal processing unit includes a focus value calculator configured to calculate a focus value from the digital image signal and output the focus value.

15. The camera system of claim 14, further comprising a pixel array that includes a plurality of unit pixels with high light sensitivity, wherein the pixel array is configured to sense image information received from an exterior.

16. The camera system of claim 14, further comprising a control and interface unit configured to control an overall operation of the image sensor chip and act as an interface with an external system.

17. The camera system of claim 14, further comprising an analog signal processing unit configured to process an analog signal from a pixel array.

18. The camera system of claim 14, further comprising an analog-to-digital (A/D) converter configured to convert an analog image signal into a digital image signal.

19. The camera system of claim 14, further comprising an interface configured to transfer the focus value to the driving chip.

20. The camera system of claim 14, wherein the focus value calculator is further configured to calculate the focus value for pixels in real time, accumulate the calculated focus value until one frame is completed, and output the resulting value in a frame unit.

21. The camera system of claim 14, wherein the driving chip is configured to receive picture information transferred from the image sensor chip and play roles in raising picture quality, compressing information, and adjusting image size.

22. The camera system of claim 14, wherein the control and interface unit comprises a finite state machine (FSM).

* * * * *